US009952812B2

(12) United States Patent
Sun

(10) Patent No.: US 9,952,812 B2
(45) Date of Patent: Apr. 24, 2018

(54) METHOD AND SYSTEM FOR CONTROLLING DIGITAL PRINTING OF SECRET FILE

(71) Applicants: Peking University Founder Group Co., Ltd., Beijing (CN); Founder Information Industry Holdings Co., Ltd., Beijing (CN); Beijing Founder Electronics Co., Ltd., Beijing (CN)

(72) Inventor: Xingxin Sun, Beijing (CN)

(73) Assignees: Peking University Founder Group Co., LTD., Beijing (CN); Founder Information Industry Holdings Co., LTD., Beijing (CN); Beijing Founder Electronics Co., LTD., Beijing (CN)

( * ) Notice: Subject to any disclaimer, the term of this patent is extended or adjusted under 35 U.S.C. 154(b) by 0 days.

(21) Appl. No.: 14/915,791

(22) PCT Filed: Dec. 6, 2013

(86) PCT No.: PCT/CN2013/088702
§ 371 (c)(1),
(2) Date: Mar. 1, 2016

(87) PCT Pub. No.: WO2015/027605
PCT Pub. Date: Mar. 5, 2015

(65) Prior Publication Data
US 2016/0196094 A1 Jul. 7, 2016

(30) Foreign Application Priority Data
Sep. 2, 2013 (CN) .......................... 2013 1 0392931

(51) Int. Cl.
H04N 1/40 (2006.01)
G06F 3/12 (2006.01)
G06F 21/60 (2013.01)

(52) U.S. Cl.
CPC .......... *G06F 3/1243* (2013.01); *G06F 3/1222* (2013.01); *G06F 3/1238* (2013.01);
(Continued)

(58) Field of Classification Search
CPC .... G06F 3/1234; G06F 3/1222; G06F 3/1238; G06F 3/1244; G06F 3/1267; G06F 3/1296; G06F 21/608
(Continued)

(56) References Cited

U.S. PATENT DOCUMENTS

2006/0232826 A1* 10/2006 Bar-El ................ G06F 21/6218
358/403
2009/0244641 A1* 10/2009 Wu ....................... G03G 21/043
358/3.28

(Continued)

FOREIGN PATENT DOCUMENTS

| CN | 1348130 | 5/2002 |
| CN | 101652744 | 2/2010 |

(Continued)

*Primary Examiner* — Quang N Vo
(74) *Attorney, Agent, or Firm* — Brinks Gilson & Lione

(57) ABSTRACT

A method and system for controlling digital printing of a secret file is provided in this invention. The method comprises: obtaining a source file to be printed; importing the source file into a secret file library; generating a printing job for the source file and adding the printing job into a job list; writing printing control information of the source file into a standard file; after the printing is started, extracting page dot matrix data of the source file from the secret file library, and processing the page dot matrix data according to the printing control information; and transmitting the processed page dot matrix data to a numerical control device. Control management may be effectively realized throughout the printing
(Continued)

process of the secret file, and the source file and the standard file cannot be copied without some professional skills in the printing process.

10 Claims, 5 Drawing Sheets

(52) U.S. Cl.
CPC .......... *G06F 3/1244* (2013.01); *G06F 3/1267* (2013.01); *G06F 3/1296* (2013.01); *G06F 21/608* (2013.01)

(58) Field of Classification Search
USPC .................... 358/3.28, 3.06, 3.13–3.19, 1.15
See application file for complete search history.

(56) References Cited

U.S. PATENT DOCUMENTS

2010/0321738 A1* 12/2010 Wu ........................ G06T 1/0021
358/3.28
2014/0002847 A1* 1/2014 Mizuno .............. G06K 15/4095
358/1.14

FOREIGN PATENT DOCUMENTS

| CN | 102523255 | 6/2012 |
| JP | 2000185449 | 7/2000 |

\* cited by examiner

METHOD AND SYSTEM FOR CONTROLLING DIGITAL PRINTING OF SECRET FILE

CROSS-REFERENCE TO RELATED APPLICATIONS

This application is a national application of PCT/CN2013/088702, filed on Dec. 6, 2013, which application claims a right of priority to Chinese Patent Application No. 201310392931.6, filed Sep. 2, 2013, both of which are incorporated herein by reference in their entirety.

TECHNICAL FIELD

This invention relates to the field of digital printing technology, and more particularly to a method and system for controlling digital printing of a secret file.

DESCRIPTION OF THE RELATED ART

Secret file printing imposes some requirements on a printing system, these requirements mainly comprises: control and management of a source file, control of the number of copies, and traceability of the copies. Currently, printing companies generally control the printing of the secret files with human intervention. FIG. 1 shows a schematic diagram of printing secret files through a flow of traditional printing management. A manager assigns a source file 101 to be printed to a specified printing operator for pre-printing management 102, mainly including control management of the source file. After the start of printing, matrix data is extracted from the source file and is inputted into a printing device to be print out. Printed copies are subjected to post-printing management 105, and unfinished copies generated during the printing process and defective copies are subjected to in-printing management 104.

Thus, the entire printing process needs human interventions in the printing management of the secret file, which mainly has the following drawbacks: management confusion due to excessive human interventions, difficulties in work handover and confirmation of responsibilities; difficult identification of fake copies and difficult to trace the leaking copies; it is easy to copy and transfer the source file and print additional copies, as a result, the secret file may eventually be revealed and spread out easily, making the secret file invalid, and it is hard to trace.

SUMMARY OF THE INVENTION

One of the objects of this invention is to provide a method and system for controlling digital printing of a secret file in order to solve the problem of secret leakage due to excessive human interventions in printing management of secret files.

A method for controlling digital printing of a secret file comprises: obtaining a source file to be printed; importing the source file into a secret file library; generating a printing job for the source file and adding the printing job into a job list; writing printing control information of the source file into a standard file; after the printing is started, extracting page dot matrix data of the source file from the secret file library, and processing the page dot matrix data according to the printing control information; and transmitting the processed page dot matrix data to a numerical control device.

Preferably, the secret file library is invisible to users.

Preferably, the method further comprises: before the step of importing the source file into the secret file library, detecting whether the source file is identified as a file that has been printed by the system; if the file is not a printed file, executing the step of importing the source file into the secret file library.

Preferably, the method further comprises: after the printing job is launched, extracting system information and writing the system information into the source file; processing the page dot matrix data according to the printing control information comprises: concealing the system information into the page dot matrix data.

Preferably, the system information comprises any one or more of: a CPU serial number, a hard disk serial number, and a network card physical address.

Preferably, concealing the system information into the page dot matrix data comprises:
superimposing a digital watermark on the page dot matrix data according to the system information.

Preferably, the method further comprises: encrypting the standard file for storing.

A system for controlling digital printing of a secret file comprises: a file library management module for creating a secret file library; an obtaining module for obtaining a source file to be printed;

a job management module for importing the source file into a secret file library; generating a printing job for the source file and adding the printing job into a job list; writing printing control information of the source file into a standard file;

a data processing module for after the printing is started, extracting page dot matrix data of the source file from the secret file library, and processing the page dot matrix data according to the printing control information; and a data transmission module for transmitting the processed page dot matrix data to a numerical control device.

Preferably, the system further comprises: a detection module for importing the source file into the secret file library by the job management module, detecting whether the source file is identified as a file that has been printed by the system; if the file is not a printed file, notifying the job management module to import the source file into the secret file library.

Preferably, the system further comprises: a system information extraction module for after the printing job is launched, extracting system information and writing the system information into the source file; the data processing module is particularly used to conceal the system information into the page dot matrix data.

A system for controlling digital printing of a secret file, characterized in comprising a processor configured to perform the following steps: obtaining a source file to be printed; importing the source file into a secret file library; generating a printing job for the source file and adding the printing job into a job list; writing printing control information of the source file into a standard file; after the printing is started, extracting page dot matrix data of the source file from the secret file library, and processing the page dot matrix data according to the printing control information; and transmitting the processed page dot matrix data to a numerical control device.

A storage medium having a program stored thereon, the program causing a computer to perform the following processes: obtaining a source file to be printed; importing the source file into a secret file library; generating a printing job for the source file and adding the printing job into a job list; writing printing control information of the source file into a standard file; after the printing is started, extracting page dot matrix data of the source file from the secret file library, and processing the page dot matrix data according to the printing control information; and transmitting the processed page dot matrix data to a numerical control device.

A method and system for controlling digital printing of a secret file is provided in embodiments of this invention, after a source file is provided by a manger, the file is imported into a secret file library dedicated to the system by a job management module, and is inserted into a job list. The manager may remove the source file. printing control information for this job is inserted into a standard file. In printing, according to user configuration information, after other processes of page dot matrix data, the data is transmitted to a numerical control device to control nozzles to output a current page. Thereby, human interventions may be reduced in the printing of the secret file. Using the secret file library, overall control management may be effectively realized in the printing of the secret file, thereby guaranteeing the security of the secret file.

Further, after the print job is launched, system information (particularly, information identifying the system ID, such as a CPU serial number, a hard disk serial number, a network card physical address, etc) is extracted and is written into the source file to be printed. After the start of printing, dot matrix data of a page is extracted from the job file, and the system information is concealed into the page dot matrix data. That is, through concealing the system information into the page dot matrix data, overall printing control management may be effectively realized for the secret file, so that during the printing process, the source file and the standard file cannot be copied without some professional skills, making the printing products traceable, i.e., capable of obtaining system information of a product according to the watermark on the product.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention, and are not intended to limit the present invention.

DETAILED DESCRIPTION OF THE PREFERRED EMBODIMENT

Below, embodiments of this invention will be described in detail with reference to the drawings.

In the prior art, control measures in the process of printing secret files are less diversified and mainly depend on human interventions, making it difficult to satisfy the requirements for secrecy control throughout the printing process of secret files and the traceability of printing products.

Thus, a method and system for controlling digital printing of a secret file is provided in embodiments of this invention. First of all, management control is performed on a source file to be printed, in which the source file is added into a dedicated secret file library controlled by the printing system and printing control information of the source file is written into a standard file; after the start of printing, page dot matrix data of the source file is extracted from the secret file library and is processed according to the printing control information. Then, the dot matrix data is transmitted to a printing device through a hardware device for printing out the page.

Further, after a printing job is launched, the source file is bound to the current printing system. System information is added to the source file to be printed. After the start of printing, the system information is concealed into the page dot matrix data, so that the output products have characteristics of being traceable.

Figure 1:
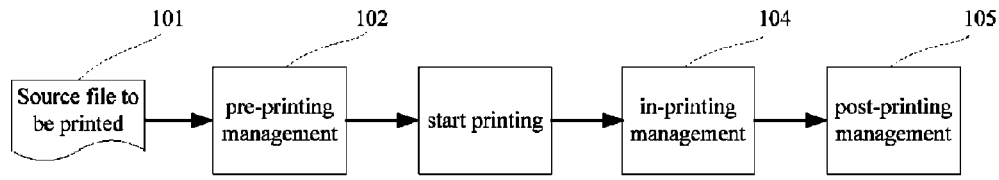
FIG. 1 shows a schematic diagram of a printing process of a secret file in the prior art.
Figure 2:
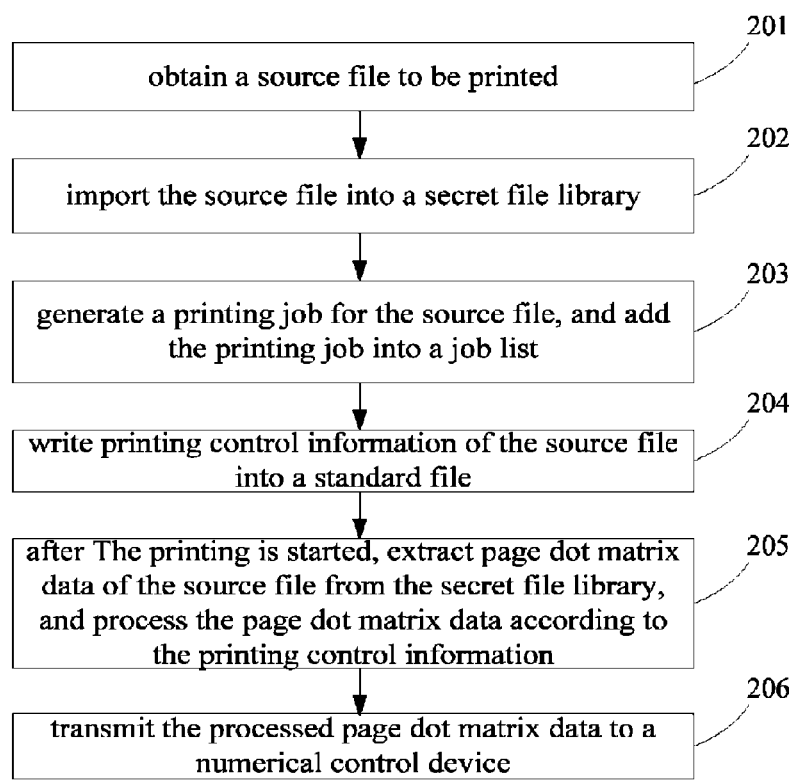
FIG. 2 shows a flowchart of a method for controlling digital printing of a secret file according to an embodiment of this invention.

As shown in FIG. 2, a flowchart of a method for controlling digital printing of a secret file according to an embodiment of this invention comprises the following steps.

Step 201: obtain a source file to be printed.

The source file is a secret file and is provided by a secret file manager, in a file format recognizable by software of the printing system.

The manger may obtain the source file via a USB flash disk, an optical disk, network transmission, a magnet disk or from other channels. After the source file is imported into the system, the transmission device may be removed or files on the disk may be deleted or removed by the manager to facilitate management and prevent abuse thereof.

Step 202: import the source file into a secret file library.

This secret file library is invisible to users and particularly may be created and managed by software of the printing system.

Step 203: generate a printing job for the source file and add the printing job into a job list.

Step 204: write printing control information of the source file into a standard file.

In order to guarantee the security of information contained in the standard file, the standard file may be encrypted and stored to prevent tampering, and may be placed into a dedicated secret file library.

Step 205: after the start of printing, page dot matrix data of the source file is extracted from the secret file library, and is processed according to the printing control information.

In printing, printing control information in a print file and its standard file(s) may be detected. The printing process is disabled if some problem occurs. For example, if it is recorded in the print file that two copies remain to be printed, while the standard file shows that all copies have been done, the file cannot be printed.

It should be noted that the process of page dot matrix data further comprises a data flow processing performed according to user configuration information (job configuration on an interface, for example, left margin, right margin of the job), after which dot matrix data printable by a numerical control device is obtained. Its particular process is similar to that in the prior art, and will not be described in detail herein.

Step 206: transmit the processed page dot matrix data to a numerical control device.

Particularly, the page dot matrix data is transmitted to the numerical control device via a transmission interface, such as PCIE (Peripheral Component Interconnection-Express) data transmission card, USB, a network card, etc.

Thus, in a method for controlling digital printing of a secret file as provided in the embodiment of this invention, after a source file is provided by a manger, the source file is imported into a secret file library dedicated to the system by a job management module, and the job is added into a job list. The manager may then remove the source file. Printing control information for this job is added into a standard file. In printing, according to user configuration information, after other processes of page dot matrix data, the data is transmitted to a numerical control device to control nozzles to output a current page. Thereby, human interventions may be reduced in the printing of the secret file. Using the secret file library, overall control management may be effectively realized in the printing of the secret file, thereby guaranteeing the security of the secret file.

Note that, in practical applications, after the printing of each file, the file may be identified to be distinguished from other files that have not been printed so as to prevent repeated printing of a file due to misoperation. Thus, between steps 201 and 203 above, the source file may be checked to determine whether it has been identified by the system as a printed file. The operation of step 202 is performed only if the result of the determination is negative.

Further, in another embodiment of this invention, further comprises the following step:

after the printing job is launched, system information is extracted, and the system information is written into the source file. Accordingly, when the page dot matrix data is processed according to the printing control information, the system information may be concealed into the page dot matrix data. Specifically, the system information may be concealed into the page dot matrix data by superimposing a digital watermark. First of all, page dot matrix data of a page is obtained from the dedicated secret file library. Then, a digital watermark is superimposed on a corresponding matrix data block according to the system information of the job. Herein, a classic discrete cosine transformation may be adopted for the digital watermarking process of the dot matrix data, and a process algorithm for adding data blocks is selectively added according to the control information to reduce the impact on the speed of printing as much as possible.

The above system information may comprise any one or more of: a CPU serial number, a hard disk serial number, a network card physical address.

In the method for controlling digital printing of a secret file according to the above embodiment of the invention, through using a secret file library and concealing the system information into the page dot matrix data, overall printing control management may be effectively realized for the secret file, so that during the printing process, the source file and the standard file cannot be copied without professional technologies, making the printing products traceable.

Further, in combination with a technique of digital watermarking technologies free of visual discrepancies provided by inkjet printing devices, in addition to safe secrecy control carried out throughout the printing of the secret file, concealed information is printed without visual discrepancies, thereby meeting the requirement for traceability.

Figure 3:
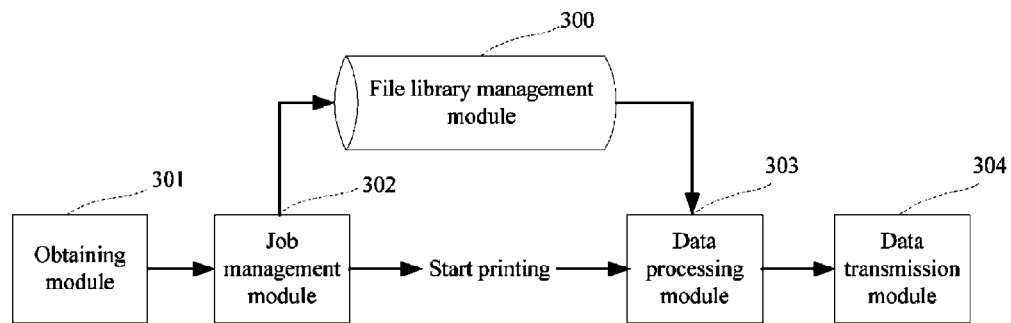
FIG. 3 shows a schematic structure diagram of a system for controlling digital printing of a secret file according to an embodiment of this invention.

Accordingly, a system for controlling digital printing of a secret file is also provided in an embodiment of this invention. FIG. 3 is a schematic structure diagram of the system which comprises:

a file library management module 300 for creating a secret file library;

an obtaining module 301 for obtaining a source file to be printed;

a job management module 302 for importing the source file into the secret file library; generating a printing job for the source file and adding the printing job into a job list; and writing printing control information of the source file into a standard file;

a data processing module 303 for, after the printing is started, extracting page dot matrix data of the source file from the secret file library, and processing the page dot matrix data according to the printing control information; and a data transmission module 304 for transmitting the processed page dot matrix data to a numerical control device.

With the system for controlling digital printing of a secret file provided in the embodiment of this invention, after a source file is provided by a manger, the source file is imported into a secret file library dedicated to the system by a job management module, and a job is added into a job list. The manager may then remove the source file. Printing control information for this job is added into a standard file. In printing, according to user configuration information, after other processes on page dot matrix data, the data is transmitted to a numerical control device to control nozzles to output a current page. Thereby, human interventions may be reduced during the printing of the secret file. Using the secret file library, overall control management may be effectively realized in the printing of the secret file, thereby guaranteeing the security of the secret file.

Note that, in practical applications of the system of an embodiment of the invention, after the printing of each file, the file may be identified to be distinguished from other files that have not been printed so as to prevent repeated printing of a file due to misoperation. Accordingly, the system further comprises: a detection module (not shown), which is configured to, before the job management module 302 imports the source file into the secret file library, detect whether the source file is a printed file that has been identified by the system. If not, the job management module is notified to import the source file into the secret file library.

Further, in another embodiment of this invention, the system may further comprise: a system information extraction module (not shown) for, after the printing job is launched, extracting system information and writing the system information into the source file. Accordingly, in this embodiment, the data processing module 303 may further conceal the system information into the page dot matrix data. Particularly, the system information may be concealed into the page dot matrix data through superimposing a digital watermark on the dot matrix. A classic discrete cosine transform may be adopted for the digital watermarking process of the dot matrix, and an algorithm for adding data blocks may be selectively performed according to the printing control information to reduce the influence on the speed of printing as much as possible.

During the printing process, the system dynamically updates the control information of the job according to actual output status of the printing process, i.e., to manage the standard file dynamically.

With the system for controlling digital printing of a secret file provided in the embodiment of this invention, through using a secret file library and concealing the control information into the page dot matrix data, overall printing control management may be effectively realized for the secret file, so that during the printing process, the source file and the standard file cannot be copied without professional technologies, and makes the output printing products traceable.

Figure 4:
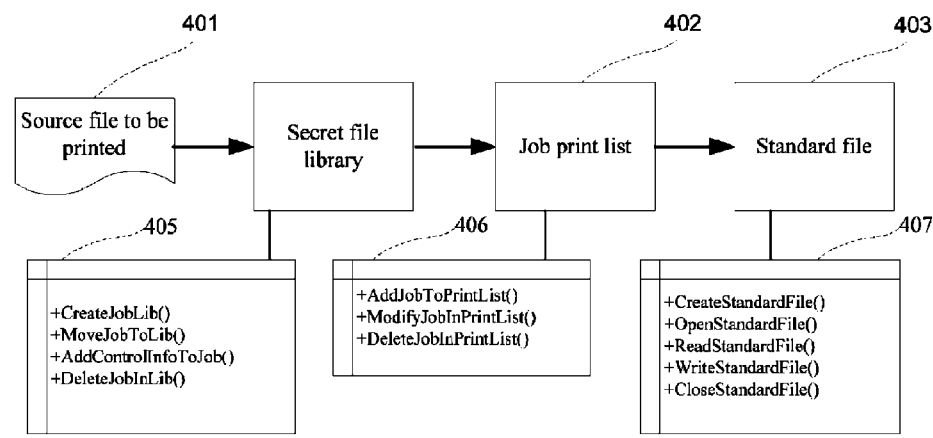
FIG. 4 shows a schematic diagram of steps of file management and control according to an embodiment of this invention.

FIG. 4 shows a schematic diagram of a file management control process according to an embodiment of this invention.

The dedicated secret file library is a special file folder which is created and managed by the system. The system may personalize the properties of dedicated file folder to hide the folder. A setting "display all hidden files" of the OS cannot make the file folder visible. Particularly, a personalized setting such as "hidden" may be provided for the file folder using the desktop.ini file.

After the source file to be printed is obtained in step 401, the printing system may copy the source file to be printed into the secret file library through MoveJobToLib( ) interface shown in 405. The system also provides interface functions that may be used by other operators.

The job is added into a printing job list in step 402, particularly, through interfaces having the following functions as shown in 406:

AddJobToPrintList( ) add a source file to be printed into a job print list;

ModifyJobInPrintList( ) modify a job in a print list;

DeleteJobInPrintList( ) delete a job from a print list.

After the job is added into the print list, the system performs further processes on the job, for example, adding control information of this job, i.e., the number of printed copies, the number of copies, printing range, etc.

A standard file is obtained through step 403. The standard file is used to manage job control information of the job print list, mainly comprising: an unique identification ID of a job, a file name of the job, a number of printing copies of the job, an identification of current printing system, a number of copies that have been printed, a number of pages that have been printed.

The standard file may be also located in the dedicated secret file library and is managed and controlled by the printing system. The system provides interfaces shown in 407 for performing operations on the standard file.

Note that steps 401 and 402 are pre-printing processes, and step 403 is continuously executed during the printing process.

Traceability of printing products is an important requirement for the printing control of secret files. Traceability of printing products makes it possible to determine responsibility for accidents, and copyright protection may be realized.

Figure 5:
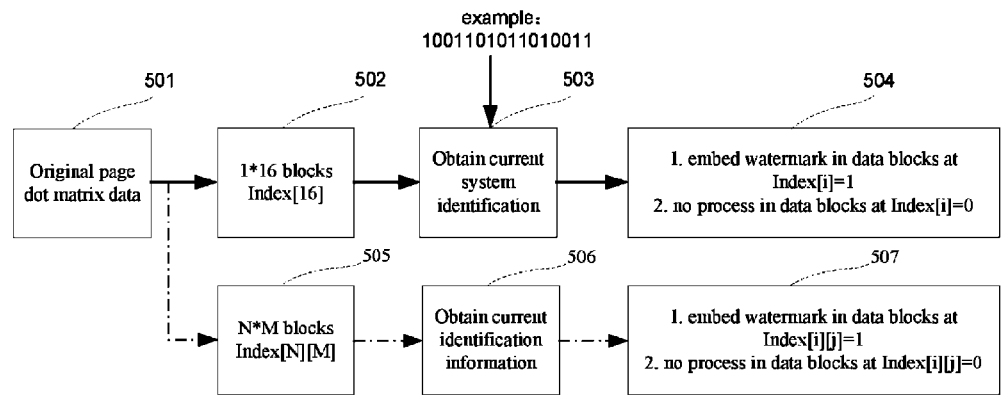
FIG. 5 shows a schematic diagram of the digital watermark processing module according to an embodiment of this invention.

FIG. 5 shows a schematic diagram of a digital watermarking process according to an embodiment of this invention.

After obtaining original page dot matrix data in step 501, the system divides the page into N×M data blocks as shown in step 505. In step 506, current identification information is obtained. Then, job control information is concealed into an index[i] [j] matrix through an encoding process. The dot matrix data may be considered as a page of data having a width and a height. i is a block index ranging from 0 to N−1 in the horizontal direction, and j is a block index ranging from 0 to M−1 in the vertical direction, wherein, i, j, N, M are integers and i≥0, j≥0. Index[i] [j] represents a value of a data block at coordinates (i,j). In step 504, with block dot matrix data as an input, based on index[i] [j], a watermark is embedded in data blocks having an index[i] [j] value of 1, while no process is performed on data blocks having an index[i] [j] value of 0.

In this embodiment, a division of 1×16 data blocks shown in step 502 is adopted. Page dot matrix data is divided into 16 blocks each having a width of ImageWidth/16 and a height of ImageHeight, wherein ImageWidth is the width of the page dot matrix data, ImageHeight is the height of the page dot matrix data. In step 503, an identification of the current printing system is obtained from the standard file. As shown in this figure, the identification of the current printing system is 1001101011010011, such that in step 504, the system perform a watermarking process on data blocks at Index[i], i=0, 1, 4, 6, 7, 9, 11, 12, 15.

After the processes of the above steps, the identification of the printing system is concealed in the page dot matrix data. The concealed system identification information may be obtained from a printing product using a corresponding watermark detection device according to statistical theories.

Figure 6:
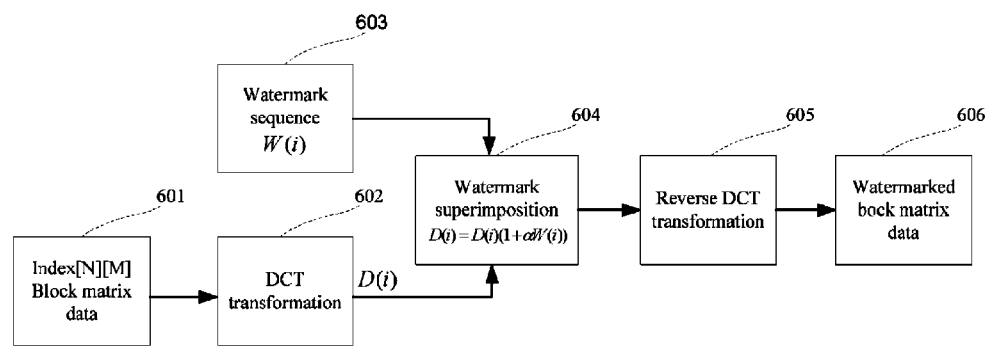
FIG. 6 shows a schematic diagram of detailed steps of a digital watermark process according to an embodiment of this invention.

FIG. 6 shows a schematic diagram of detailed steps of a digital watermarking process according to an embodiment of this invention.

In step 601, matrix data blocks having a value of 1 are obtained from Index[i][j]. The system performs a DCT (discrete cosine transformation) on these data blocks in step 602, which is a spectrum expansion algorithm in a transformation domain. The first K (K is an integer and K≥1) maximum components of the obtained DCT coefficients are extracted as D(i), i=0, . . . , k−1, which do not comprise DC components. In step 603, a sequence of pseudo-random real numbers sequence w(i), i=0, . . . , k−1 submitting Gaussian distribution is obtained. In step 604, a watermark embedding algorithm D(i)=D(i)(1+αW(i)) is performed, wherein a is a scale factor for controlling a strength of watermarking. In step 605, a reverse DCT process is performed using the new DCT coefficients to obtain watermarked matrix block data 606.

In the above watermarking process, the watermark is embedded to low frequency components in the DCT domain, mainly for the purpose of preventing the watermarking process from impacting the visibility of the printing product. It should be noted that embedding to low frequency components may cause low robustness of watermarking.

After the data block division and digital watermarking processes of a page of matrix data, it may be transmitted to a numerical control device via a hardware device for printing.

Figure 7:
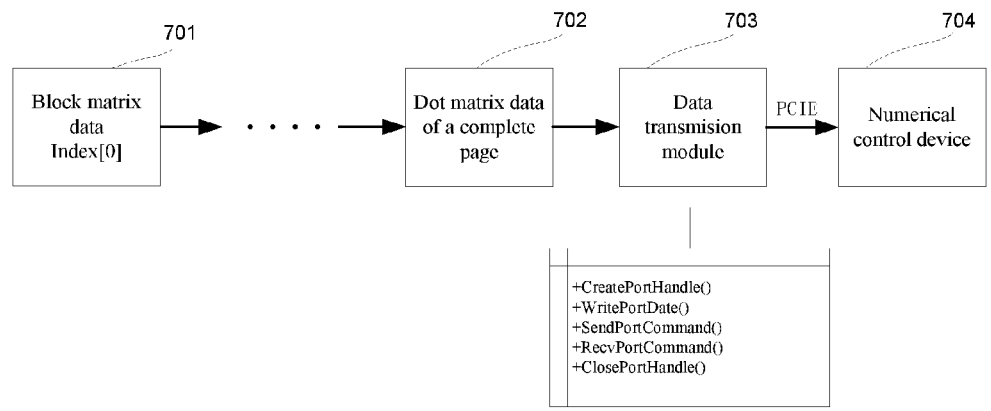
FIG. 7 shows a schematic diagram of an integration and transmission module after watermark processing of the dot matrix data according to an embodiment of this invention.

FIG. 7 shows a schematic diagram of an integration and transmission process after the dot matrix data watermarking according to an embodiment of this invention.

Through the processes between steps 701 to 702, the system obtains dot matrix data of a complete page, and transmits the data to a data transmission module 703. The data transmission module 703 transmits the data to a numerical control device 704. The data transmission module 703 is provided with interfaces to facilitate a PCIE kernel mode driver to complete the transmission of the dot matrix data. The interfaces mainly comprise: CreatePortHandle( ) for creating and opening a device; WritePortData( ) for data writing; SendPortCommand( ) for sending a command; RecvPortCommand( ) for receiving a command; and ClosePortHandle( ) for closing the device after the use of the device.

In the method and system provided in the embodiments of this invention, with fewer interventions of human operators, management control may be realized throughout the printing process of a secret file. In a better combination with current inkjet printing systems, the requirements of source file control, copy number control and traceability may be satisfied, making the whole system effectively accommodate the requirements for current secret file printing.

Obviously, those skilled in the art should understand each of the foregoing modules or steps of the present invention may be realized with general computing devices, they may be concentrated on a single computing device, or distributed in a network constituted by a plurality of computing devices, optionally they may be realized with program codes executable by computing devices, thereby they may be stored in storage devices and executed by computing devices, or they may be made into IC modules, or a plurality of modules or steps among them are made into a single IC module. In this way, the present invention is not limited to the combination of any specific hardware and software.

Figure 8:
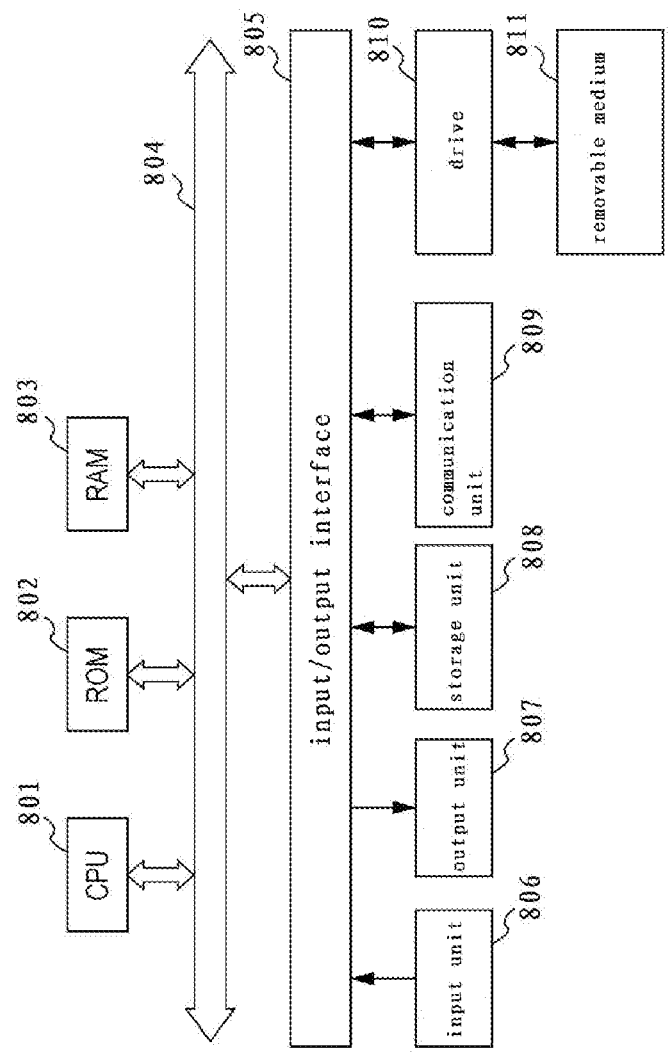
FIG. 8 shows a block diagram of an example of the structure of a computer.

FIG. 8 illustrates a block diagram of an example of the structure of a computer.

A CPU (Central Processing Unit) 801 serves as a data processing section for executing various types of processing in accordance with a program stored in ROM (Read Only Memory) 802 or a storage unit 808. For example, the CPU 801 executes the processes described above. A program that the CPU 801 executes, data, and so forth are stored in RAM (Random Access Memory) 803 as appropriate. These CPU 801, ROM 802, and RAM 803 are mutually connected by a bus 804.

The CPU 801 is connected to an input/output interface 805 via the bus 804, and an input unit 806 made up of various types of switches, keyboard, mouse, microphone, and so forth, and an output unit 807 made up of a display, speakers, and so forth are connected to the input/output interface 805. The CPU 801 executes various types of processing corresponding to a command input from the input unit 806, and outputs the processing result to, for example, the output unit 807.

The storage unit 808 connected to the input/output interface 805 is made up of, for example, a hard disk or the like, and stores a program that the CPU 801 executes, and various types of data. A communication unit 809 communicates with an external device via a network such as the Internet or local area network, or the like.

A drive 810 connected to the input/output interface 805 activates a removable medium 811 such as a magnetic disk, optical disc, magneto-optical disk, or semiconductor memory such as a memory card or the like to obtain various types of data such as recorded content, key information, and so forth. For example, a process of adjusting the paper feeding speed of a digital printing system is performed using the obtained content and key data in accordance with the playing program that the CPU executes.

It shall be noted that there are a number of ways to implement the method and system of this invention. For example, the mechanisms of the method and system of this invention can be implemented via software, hardware, firmware or any combination thereof. The specific order that the steps of the method are described is merely for explanations and shall not be construed as a restriction, unless it is specifically defined in other ways. Further, in certain embodiments, the present invention can be implemented as programs that are recorded on a recording medium. These programs include machine readable instructions for implementing the method according to the present invention. Therefore, the present invention also covers a recording medium that stores programs for executing the method of the present invention.

Though the present invention is described in details in combination of certain specific embodiments, those skilled in the art will understand that the above examples are merely for purpose of explanations and shall not be construed as any restriction of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A method for controlling digital printing of a secret file, comprising:
   obtaining a source file to be printed;
   importing the source file into a secret file library, wherein the secret file library is a dedicated file folder and is hidden from users;
   generating a printing job for the source file and adding the printing job into a job list;
   writing printing control information of the source file into a standard file, wherein the printing control information includes at least one of a number of printed copies, a number of copies, a printing range, an unique identification ID of a job, a file name of the job, a number of printing copies of the job, an identification of current printing system, and a number of pages that have been printed, wherein the standard file is encrypted and stored in the secret file library;
   after the printing is started, extracting page dot matrix data of the source file from the secret file library, and processing the page dot matrix data according to the printing control information; and
   transmitting the processed page dot matrix data to a numerical control device.

2. The method of claim 1, characterized in that the method further comprises:
   detecting whether the source file is a printed file that has been identified by the system, before the step of importing the source file into the secret file library;
   if the source file is not a printed file, performing the step of importing the source file into the secret file library.

3. The method of claim 1, characterized in that the method further comprises:
   after the printing job is launched, extracting system information and writing the system information into the source file;
   the step of processing the page dot matrix data according to the printing control information comprises: concealing the system information into the page dot matrix data.

4. The method of claim 3, characterized in that the system information comprises any one or more of: a CPU serial number, a hard disk serial number, and a network card physical address.

5. The method of claim 3, characterized in that concealing the system information into the page dot matrix data comprises:
   superimposing a digital watermark on the page dot matrix data according to the system information.

6. A system for controlling digital printing of a secret file, comprising:
   a file library management module for creating a secret file library, wherein the secret file library is a dedicated file folder and is hidden from users;
   an obtaining module for obtaining a source file to be printed;
   a job management module for importing the source file into the secret file library, generating a printing job for the source file and adding the printing job into a job list, writing printing control information of the source file into a standard file, wherein the printing control information includes at least one of a number of printed copies, a number of copies, a printing range, an unique identification ID of a job, a file name of the job, a number of printing copies of the job, an identification of current printing system, and a number of pages that have been printed, wherein the standard file is encrypted and stored in the secret file library;

a data processing module for, after the printing is started, extracting page dot matrix data of the source file from the secret file library, and processing the page dot matrix data according to the printing control information; and a data transmission module for transmitting the processed page dot matrix data to a numerical control device.

7. The system of claim 6, characterized in that the system further comprising:

a detection module for, before the job management module importing the source file into the secret file library, detecting whether the source file is a printed file that has been identified by the system, if the source file is not the printed file, notifying the job management module to import the source file into the secret file library.

8. The system of claim 6, characterized in that the system further comprises:

a system information extraction module for, after the printing job is launched, extracting system information and writing the system information into the source file, wherein the data processing module is configured to conceal the system information into the page dot matrix data.

9. A system for controlling digital printing of a secret file, comprising a processor configured to perform the following steps:

obtaining a source file to be printed;

importing the source file into a secret file library, wherein the secret file library is a dedicated file folder and is hidden from users;

generating a printing job for the source file and adding the printing job into a job list;

writing printing control information of the source file into a standard file, wherein the printing control information includes at least one of a number of printed copies, a number of copies, a printing range, an unique identification ID of a job, a file name of the job, a number of printing copies of the job, an identification of current printing system, and a number of pages that have been printed, wherein the standard file is encrypted and stored in the secret file library;

after the printing is started, extracting page dot matrix data of the source file from the secret file library, and processing the page dot matrix data according to the printing control information; and transmitting the processed page dot matrix data to a numerical control device.

10. A non-transitory computer readable storage medium on which a program is recorded, the program causing a computer to perform the following processes:

obtaining a source file to be printed;

importing the source file into a secret file library, wherein the secret file library is a dedicated file folder and is hidden from users;

generating a printing job for the source file and adding the printing job into a job list;

writing printing control information of the source file into a standard file, wherein the printing control information includes at least one of a number of printed copies, a number of copies, a printing range, an unique identification ID of a job, a file name of the job, a number of printing copies of the job, an identification ID of a job, a file name of the job, a number of printing copies of the job, an identification of current printing system, and a number of pages that have been printed, wherein the standard file is encrypted and stored in the secret file library;

after the printing is started, extracting page dot matrix data of the source file from the secret file library, and processing the page dot matrix data according to the printing control information; and transmitting the processed page dot matrix data to a numerical control device.

* * * * *